Feb. 5, 1963   H. R. MEAHL   3,076,914
ELECTROMAGNETIC FIELD STRENGTH INDICATOR
Filed June 20, 1960   2 Sheets-Sheet 1

Inventor:
Harry R. Meahl,
by Paul A. Frank
His Attorney.

Feb. 5, 1963  H. R. MEAHL  3,076,914
ELECTROMAGNETIC FIELD STRENGTH INDICATOR
Filed June 20, 1960  2 Sheets-Sheet 2

Inventor:
Harry R. Meahl,
by Paul A. Frank
His Attorney.

United States Patent Office 3,076,914
Patented Feb. 5, 1963

3,076,914
ELECTROMAGNETIC FIELD STRENGTH INDICATOR
Harry R. Meahl, Schenectady, N.Y., assignor to General Electric Company, a corporation of New York
Filed June 20, 1960, Ser. No. 37,515
4 Claims. (Cl. 313—185)

This invention relates to an apparatus for detecting and measuring electromagnetic field intensity and more particularly, to one which uses ionizable gas as the sensing medium.

It has been suggested that measurement of electromagnetic field in and around such devices as cavity resonators, particle accelerators, and radar installations may be carried out in a simple and effective manner by utilizing the electric field component to energize an encapsulated ionizable gaseous medium. The ionizable gaseous medium, customarily an inert gas such as helium, is ionized whenever the electric field reaches a given intensity level and emits light to provide a visual indication. Such gaseous field strength sensing devices are also known as "glo-balls" and are described in detail in article entitled "Glo-Ball" Development, James F. Steinhouse, The Review of Scientific Instruments, volume 27, No. 8, August 1956, pages 575 thru 580. While devices of the type described in the above identified article are useful for many purposes and are, from the standpoint of simplicity and size, an improvement over other previously known devices, they do have a number of shortcomings which limit their usefulness, and particularly their usefulness as personnel hazard monitoring devices in conjunction with high power radiation sources such as those found at radar sites, for example.

In order to be useful as personnel monitoring devices, the electric field intensity level, in terms of volts/cm., necessary to ionize the gas in the device must be substantially constant for a given set of operating conditions. It has been found, however, that the devices are quite unstable and the ionization potential for identical devices, or in fact for the same device, may vary over a relatively wide range of values. This limits the usefulness of the device, particularly in the area of personnel hazard monitoring since failure of the device to glow at a given intensity level because of a change in the ionization potential may expose personnel to substantial hazards; a condition which cannot be tolerated in a monitoring or warning device.

In addition, field intensity devices which use ionizable helium as the sensing medium have an additional shortcoming in that they not sufficiently sensitive for use in personnel hazard monitoring systems. Where the devices are to be used to protect personnel from the hazards of high intensity RF fields it is desirable to provide indicators which will ionize and produce a visible indication at fairly low voltage gradient in terms of volts per centimeter. The prior art devices however do not produce ionization much below 25–30 volts per centimeter whereas for use in protecting personnel from RF hazards a device which ionizes and produces a visual indication of the order of 10 volts per centimeter or less is highly desirable.

Furthermore, helium filled sensing devices undergo an "aging" effect in that the critical voltage gradient for ionizing the gas increases with time and use. This phenomenon is particularly noticeable if continuous ionization of the medium is permitted for any length of time. This loss of firing stability with age and use constitutes a further limitation on the prior art devices particularly as personnel hazard monitoring devices.

In accordance with the present invention, most of these difficulties can be obviated and a stable, highly sensitive, long term field intensity sensing device can be provided by adding a trace of an inert stabilizing gas to the ionizable medium.

It is an object of this invention, therefore, to provide an electromagnetic field intensity sensing device which is highly stable and sensitive;

A further object of this invention is to provide an electromagnetic field intensity sensing device which does not deteriorate with use and maintains its stability and sensitivity characteristics;

Still another object of this invention is to provide an electric field sensing device which is simple, accurate, and is useful as an RF hazard warning device;

Other objects and advantages of the instant invention will become apparent as the description thereof proceeds.

In accordance with one form of the invention the foregoing objects and advantages may be achieved by adding a trace of an inert ionizable gas, such as neon, to a larger volume of ionizable inert gas such as helium and thereby increasing the sensitivity and the firing stability of the device.

The novel features which are believed to be characteristic of this invention are set forth with particularity in the appended claims. The invention itself, however, both as to it organization and method of operation may best be understood by reference to the following description taken in connection with the accompanying drawings in which:

Figure 1:
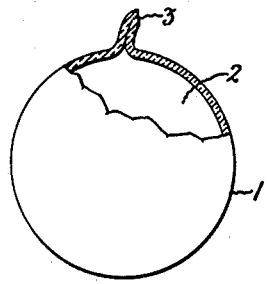
FIGURE 1 is a schematic illustration of the field sensing device.

The invention will be most readily understood by reference to FIGURE 1 in which the novel electric field and indicating device is illustrated. The sensing device consists of a hollow light transparent sphere 1 filled with a gaseous mixture 2 comprising a larger volume of ionizing medium such as helium and a small trace, preferably 1% or less by volume, of an inert, ionizable gas such as neon which stabilizes the firing potential of the unit and increases its sensitivity. The sphere is usually made of glass or quartz or in fact any material which is substantially permeable to electromagnetic radiation and which transmits light in the visible range. The gas mixture is introduced through a filler tube 3 which is subsequently sealed off. In the instant case where the gaseous field indicating and measuring device is described in connection with its use as an RF hazard monitoring device a spherical shape is preferable because of its omnidirectional response characteristics. However, it will be understood that configurations other than the spherical one illustrated in FIGURE 1 may be utilized.

The size of the device in terms of the diameter of the sphere is also controlled by the use to which the device is put and is usually a compromise between the permissible physical size and the desired sensitivity. That is, it has been found that the sensitivity of the device in terms of the critical voltage gradient for ionization in volts per centimeter varies inversely with diameter. The underlying reasons for the relationship between sensitivity and diameter are not completely understood; however, it is believed that for a given pressure of gas the mean free path of the gas molecules varies directly with changes in diameter so that reducing the diameter of the sphere shortens the mean free path. Hence more energy must be added to the molecules to accelerate them sufficiently to cause ionization by collision for the given mean free path. This explanation is put forward as a theory only and is not to be considered limiting in any sense. Thus, the actual size of the device is always a compromise between the desire for a large diameter sphere in order to increase the sensitivity and the permissible physical size for the particular application.

The ionizable gas mixture is introduced into sphere 1 at a relatively low pressure for it has been found that by employing a low pressure gas mixture, on the order of 1–100 millimeters of mercury or less, the critical ionization voltage gradient is insensitive to pressure variations. In a preferred embodiment, a 4" diameter sphere was filled with a mixture of helium at 3.5 millimeters of mercury pressure and neon at 30 microns of mercury pressure. Thus for this particular embodiment the trace element neon comprised a .9% by the volume of the gas mixture. The device was then tested by impressing electromagnetic energy thereon over a range of frequencies extending from 50 megacycles to 500 megacycles and the ionization voltage gradient was found to be unaffected by frequency changes. The device was further tested by varying the polarization of the impressed electromagnetic field. The firing stability and sensitivity of the device were also found to be unaffected by the polarization of the field.

Figure 2:
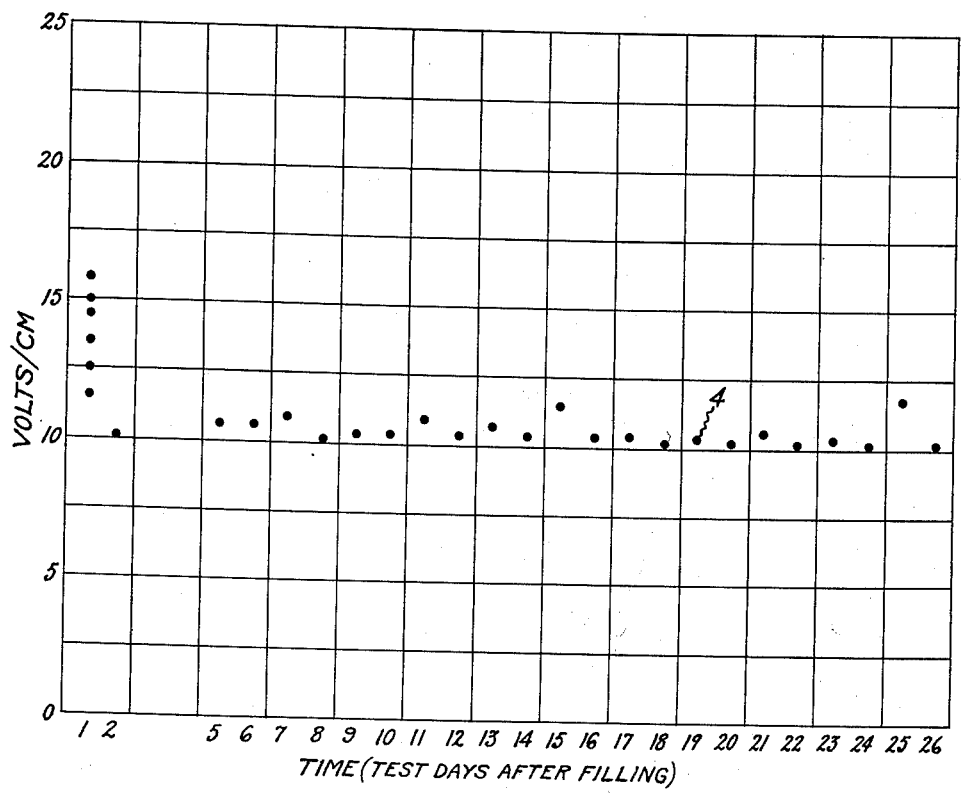
FIGURES 2 and 3 are curves illustrating the operating characteristics of the novel measuring and indicating device.

It was found, however, that immediately after filling there is a temporary instability and the critical ionization voltage gradient is relatively high and varies with each firing. However, this initial instability is temporary and the operational characteristics may be stabilized by ionizing the gas a number of times after which the ionization voltage gradient is reduced and becomes stable. FIGURE 2 illustrates this effect graphically and represents by curve 4 the critical ionization voltage of a 4" diameter sphere filled with a mixture of helium at 3.5 millimeters of mercury pressure and neon at 30 microns of mercury pressure energized by a 50 megacycle RF signal. As may be seen from the curve 4 of FIGURE 2, wherein field gradient in volts per centimeter is plotted along the ordinate and firings on different days along the abscissa. The initial critical ionization or firing voltage gradient was approximately 17 volts per centimeter. With each succeeding firing of the sphere the ionization voltage gradient is lowered until it finally stabilized at approximately 10.5 volts per centimeter and remained stable through many subsequent applications of the electromagnetic field. The cause of this initial instability is not presently understood; however, after initially stabilizing the device no further "aging" has been observed and the device remains stable through any number of subsequent firings.

Figure 3:
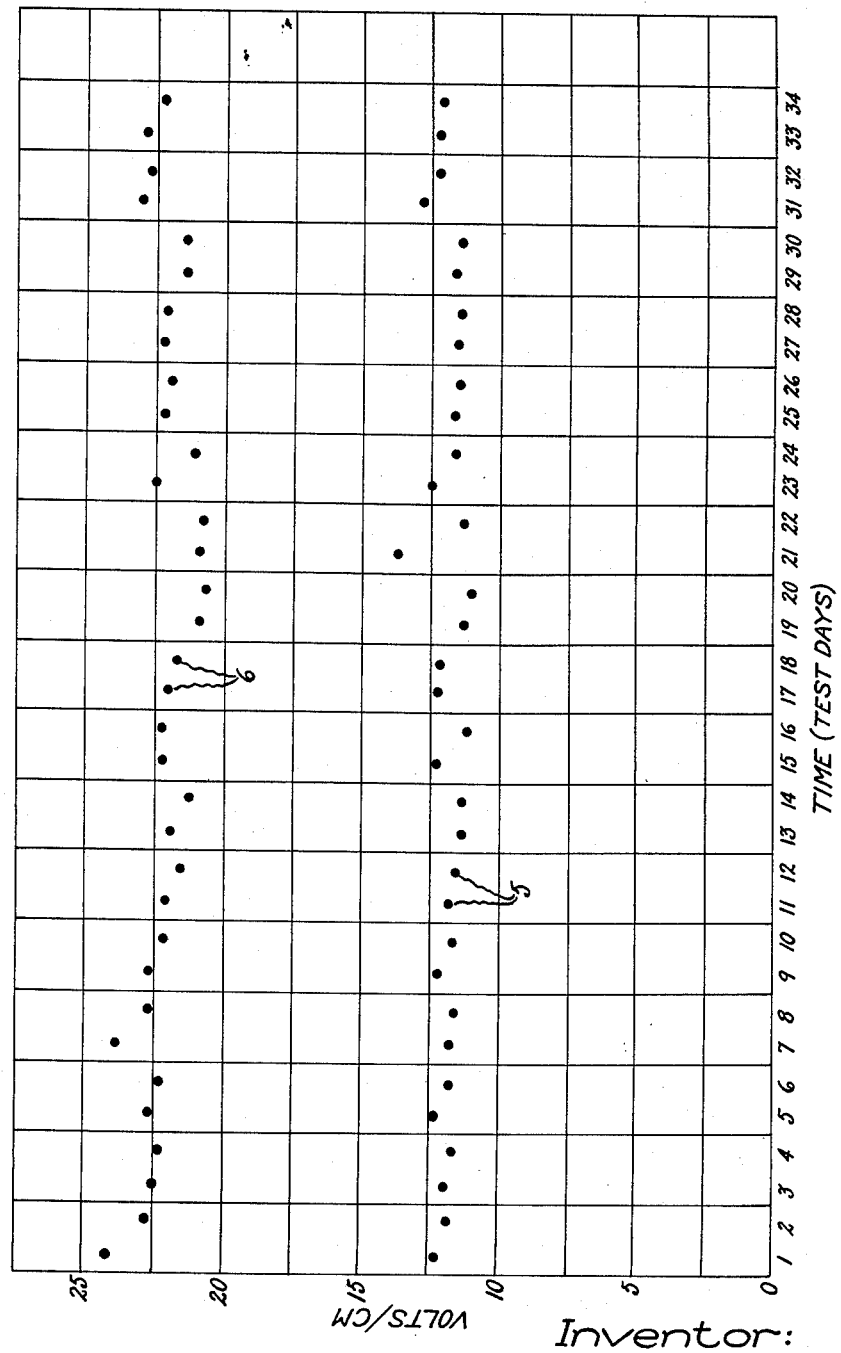

In order to determine the effect of the neon trace gas on the sensitivity two 4" diameter spheres were prepared and one sphere was charged with a mixture of helium at 3.5 millimeters of mercury pressure and neon at 30 microns of mercury pressure and the other sphere was free of any neon trace gas. Both spheres were tested with a 50 megacycle RF field and the critical ionization voltage gradient in volts per centimeter plotted. Curves 5 and 6 of FIGURE 3 illustrate the results of these tests graphically and represent, respectively, the critical ionization voltage gradients for the sphere containing a trace of neon and sphere without the neon. It may be seen by observation that the sphere containing the trace of neon consistently fires at a much lower voltage gradient. Furthermore, it is also apparent that the critical ionization voltage gradient for the device without the neon trace element is somewhat more erratic and, hence, this device is less stable in operation than the novel measuring and sensing devices of the invention.

The field strength sensing device of this invention will, in most circumstances, be utilized as a visual indicator in personnel RF hazard monitoring systems. It may, however, also be used in connection with automatic warning systems by positioning the gas filled sphere in a light opaque container which, however, is pervious to the electromagnetic field. A photosensitive element, such as a photovoltaic cell, is positioned within the opaque container to intercept the emitted light and produces a control signal to energize a relay or an audible warning system when the gas mixture in the sphere is ionized. In such an arrangement care must be taken, however, that the photosensitive element is so positioned that it does not upset the field pattern in the vicinity of the gas filled sphere and does not interfere with its omnidirectional response.

It can be seen therefore, that the instant invention provides a highly improved field strength sensing device which has greater stability and higher sensitivity than those previously known and represents a substantial and useful contribution to the art.

While a particular embodiment of this invention has been shown, it will, of course, be understood that it is not limited thereto since many additional modifications both in circuit arrangement and in the instrumentalities employed may be made. It is contemplated by the appended claims to cover any such modifications as fall within the true spirit and scope of the invention.

What I claim as new and desire to secure by Letters Patent of the United States is:

1. An electrodeless omnidirectional electromagnetic field strength sensing and indicating device comprising a light transparent and radiation pervious hollow sphere filled with an ionizable gas mixture including substantially 99% helium as the main ionizable constituent and the balance mainly neon to stabilize ionization voltage gradient of said mixture, whereby said gas mixture emits visible light under the influence of an electromagnetic field of predetermined strength.

2. The field strength sensing device of claim 1 wherein the gas mixture contains no more than 1% by volume of neon.

3. An electrodeless omnidirectional electromagnetic field strength sensing and indicating device comprising a light transparent and radiation pervious hollow sphere filled with an ionizable low pressure gas mixture, said mixture including substantially 99% helium as the main ionizable constituent and the balance mainly neon to stabilize the ionization voltage gradient of said mixture, whereby said gas mixture emits visible light under the influence of an electromagnetic field of predetermined strength.

4. The field strength sensing device of claim 3 wherein the gas mixture in said sphere is maintained at a pressure of 100 millimeters of mercury or less.

References Cited in the file of this patent

UNITED STATES PATENTS

| | | |
|---|---|---|
| 1,481,422 | Holst et al. | Jan. 22, 1924 |
| 1,946,477 | Beck et al. | Feb. 13, 1934 |
| 2,185,674 | Michael | Jan. 2, 1940 |